United States Patent
Lee

(10) Patent No.: US 9,118,900 B2
(45) Date of Patent: Aug. 25, 2015

(54) 3-DIMENSIONAL CAMERA MODULE HAVING X-PRISM AND USING METHOD THEREOF

(75) Inventor: Jungyul Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 435 days.

(21) Appl. No.: 13/703,831

(22) PCT Filed: Jun. 16, 2011

(86) PCT No.: PCT/KR2011/004417
§ 371 (c)(1),
(2), (4) Date: Dec. 12, 2012

(87) PCT Pub. No.: WO2012/002661
PCT Pub. Date: Jan. 5, 2012

(65) Prior Publication Data
US 2013/0093858 A1    Apr. 18, 2013

(30) Foreign Application Priority Data

Jun. 30, 2010 (KR) .................. 10-2010-0062830

(51) Int. Cl.
| | | |
|---|---|---|
| *H04N 13/02* | (2006.01) | |
| *H04N 5/225* | (2006.01) | |
| *G02B 27/26* | (2006.01) | |
| *G02B 27/22* | (2006.01) | |
| *G02B 27/28* | (2006.01) | |

(52) U.S. Cl.
CPC ........ *H04N 13/0207* (2013.01); *G02B 27/2264* (2013.01); *G02B 27/26* (2013.01); *G02B 27/283* (2013.01); *H04N 5/2253* (2013.01); *H04N 5/2254* (2013.01); *H04N 13/021* (2013.01)

(58) Field of Classification Search
CPC . H04N 5/2253; H04N 5/2254; H04N 5/2625; H04N 5/2627; H04N 13/0207; H04N 13/021; G02B 27/2228; G02B 27/2235; G02B 27/2242; G02B 27/2264; G02B 27/26; G02B 27/283
See application file for complete search history.

(56) References Cited

U.S. PATENT DOCUMENTS 5,742,333 A * 4/1998 Faris ............................. 348/60
5,835,133 A 11/1998 Moreton et al.
(Continued)

FOREIGN PATENT DOCUMENTS

| JP | 2010-56865 A | 3/2010 |
|---|---|---|
| KR | 10-0699561 B1 | 3/2007 |

*Primary Examiner* — Daniel M Pasiewicz
(74) *Attorney, Agent, or Firm* — Birch, Stewart, Kolasch & Birch, LLP

(57) ABSTRACT

The present invention relates to a 3-dimensional camera module having an X-prism, and a using method thereof, the camera module including: a pair of lenses condensing incident light; a pair of shutters positioned at a center axis of each lens to open/close with a time difference for interrupting or passing the condensed incident light; a pair of polarizers vertically polarizing the incident light having passed any one shutter of the pair of shutters; an X-prism shaped of a rectangular parallelepiped coupled with four prism units and coated with a reflection film for selectively reflecting the vertically polarized incident light; and an image sensor continuously receiving the vertically polarized incident light and the horizontally polarized incident light reflected to the reflection film with a time difference to generate left/right images corresponding to the vertically polarized incident light and the horizontally polarized incident light in association with the pair of shutter.

16 Claims, 3 Drawing Sheets

(56) References Cited

U.S. PATENT DOCUMENTS

| | | |
|---|---|---|
| 6,363,225 B1* | 3/2002 | Sugawara ................. 396/331 |
| 6,864,910 B1* | 3/2005 | Ogino et al. ................. 348/42 |
| 2001/0019450 A1* | 9/2001 | Ogino ................. 359/462 |
| 2003/0048416 A1* | 3/2003 | Meltzer ................. 352/60 |
| 2003/0174237 A1* | 9/2003 | Lee ................. 348/363 |
| 2010/0321777 A1* | 12/2010 | Martinez et al. ................. 359/465 |
| 2012/0154552 A1* | 6/2012 | Wakazono ................. 348/49 |

* cited by examiner

3-DIMENSIONAL CAMERA MODULE HAVING X-PRISM AND USING METHOD THEREOF

TECHNICAL FIELD

The teachings in accordance with the exemplary embodiments of this invention relate generally to a 3-dimensional camera module having an X-prism and a using method thereof, and more particularly to a 3-dimensional camera module having an X-prism capable of sequentially generating, by a single image sensor, left/right images with a time difference, and a using method thereof.

BACKGROUND ART

A 3 dimensional (3D) image is perceived by allowing a viewer's left/right eyes to respectively view different images and the different images to be combined in brains, whereby a 3D, stereoscopic image (a 3D image) that provides a sense of depth can be realized. To this end, left/right two images are generally needed to allow the left/right eyes to perceive respectively different images.

The 3D images in prior art 3D camera are embodied by two camera modules respectively applied with two image sensors with two lenses, whereby a circuit unit for driving two camera modules is complicated to disadvantageously be disabled to use two sensors when one of the two image sensors is malfunctioned. In order to overcome this disadvantage, there is a need to provide a new 3D camera module capable of simplifying a complicated circuitry and obtaining a 3D image using only a single image sensor as well.

DISCLOSURE OF INVENTION

Technical Problem

The present invention is disclosed to cater to the above-mentioned need, and it is a first object to provide a 3-dimensional camera module having an X-prism capable of sequentially generating, by a single image sensor, left/right images with a time difference in embodying the 3D image, and a using method thereof.

It is a second object to provide a 3-dimensional camera module having a pair of shutters that open/close with a time difference, an image sensor activated in association with the pair of shutters, and an X-prism capable of sequentially generating left/right images through a differential reflection caused by polarization, and a using method thereof.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a 3-dimensional camera module having an X-prism, the camera module comprising: a pair of lenses condensing incident light; a pair of shutters positioned at a center axis of each lens to open/close with a time difference for interrupting or passing the condensed incident light; a pair of polarizers vertically polarizing the incident light having passed any one shutter of the pair of shutters, and horizontally polarizing the incident light having passed the other shutter of the pair of shutters; an X-prism shaped of a rectangular parallelepiped coupled with four prism units and coated with a reflection film for selectively reflecting the vertically polarized incident light and the horizontally polarized incident light to each diagonal surface of the rectangular parallelepiped; and an image sensor continuously receiving the vertically polarized incident light and the horizontally polarized incident light reflected to the reflection film with a time difference to generate left/right images corresponding to the vertically polarized incident light and the horizontally polarized incident light in association with the pair of shutter.

Preferably, the condensed incident light is an un-polarized light.

Preferably, each of the pair of shutters continuously and differently opens and closes for interrupting or passing the condensed incident light.

Preferably, each of the prism units takes the shape of a trigonal pillar.

Preferably, the reflection film is a dielectric coating respectively corresponding to the vertically polarized incident light and the horizontally polarized incident light for selectively determining reflected polarization components.

Preferably, the image sensor includes a plurality of pixels, the plurality of pixels being separately activated to respectively correspond to the left/right images.

Preferably, the camera module is further comprising a pair of reflection mirrors each positioned on a light passage of the condensed incident light having passed the pair of shutters for changing the light passage to face the pair of polarizers.

Preferably, the camera module is further comprising a module case mounted therein with the pair of shutters, the pair of polarizers, the X-prism and the image sensor and forming an external appearance.

In another general aspect of the present invention, there is provided a method for using a 3-dimensional camera module having an X-prism, the method comprising: allowing a first incident light to pass through a first lens among a pair of lenses and to be condensed (S10); allowing the first condensed incident light to pass a first shutter among a pair of shutters that is opened and closed with a time difference by being positioned at a center axis of the first lens (S20); allowing the first condensed incident light to be vertically polarized by a first polarizer among a pair of polarizers (S30); allowing a vertically polarized first incident light to be reflected to a first diagonal surface of the X-prism shaped of a rectangular parallelepiped coupled with four prism units through a first reflection film coated in response to the vertical polarization (S40); allowing the vertically polarized first incident light to be converted to any one first image among left/right images by being received by an image sensor activated in association with the first shutter based on the time difference (S50); allowing a second incident light to pass through a second lens among the pair of lenses and to be condensed (S60); allowing the condensed incident light to pass through a second shutter positioned on a center axis of the second lens among the pair of shutters (S70); allowing the condensed second incident light to be horizontally polarized by a second polarizer among the pair of polarizers (S80); allowing the horizontally polarized second incident light to be reflected to a second diagonal surface of the X-prism through a second reflection film coated in response to the horizontal polarization (S90); and allowing the horizontally polarized second incident light to be converted to any one second image among the left/right images by being received by the image sensor activated in association with the second shutter based on the time difference (S100).

Preferably, the first image and the second image form a 3D image by being mutually combined, in the first image conversion step (S50) of the vertically polarized first incident light and the second image conversion step (S100) of the horizontally polarized second incident light.

Preferably, the first reflection film is coated with a dielectric substance to reflect the vertically polarized first incident light, in the first reflection film reflecting step (S40) of the vertically polarized first incident light.

Preferably, the second reflection film is coated with a dielectric substance to reflect the horizontally polarized second incident light, in the second reflection film reflecting step (S90) of the horizontally polarized second incident light.

Preferably, the image sensor includes a plurality of pixels, some of the plurality of pixels being activated, in the first image converting step (S50) of the vertically polarized first incident light.

Preferably, the image sensor includes a plurality of pixels, some of the plurality of pixels being activated, in the second image converting step (S100) of the horizontally polarized second incident light.

Preferably, a step (S25) of the first condensed incident light having passed through the first shutter being reflected to the first polarizer through a first reflection mirror is further included, between the first shutter passing step (S20) of the condensed first incident light and the vertically polarizing step (S30) of the condensed first incident light.

Preferably, a step (S75) of the second condensed incident light having passed through the second shutter being reflected to the second polarizer through a second reflection mirror is further included, between the second shutter passing step (S70) of the condensed second incident light and the horizontally polarizing step (S80) of the condensed second incident light.

Advantageous Effects of Invention

The 3-dimensional camera module having an X-prism and a using method thereof according to the present invention has an advantageous effect in that the number of image sensors forming a 3D camera can be reduced to simplify a sensor driving circuit.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
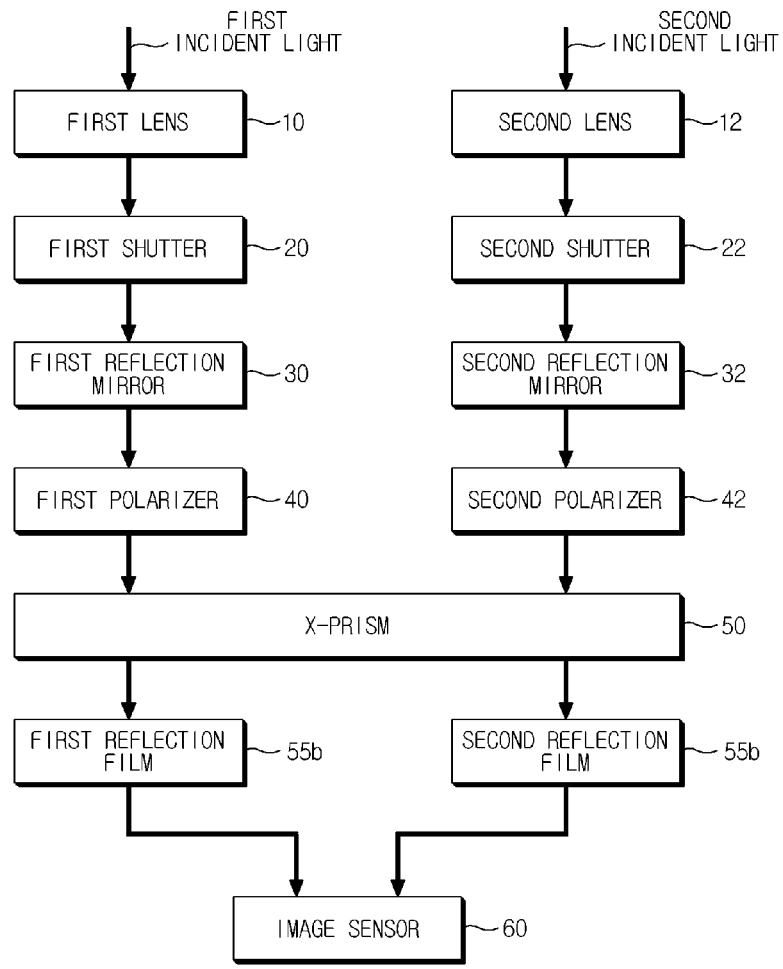
FIG. 1 is a schematic block diagram illustrating a 3-dimensional camera module having an X-prism according to an exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings. In addition, descriptions of well-known functions and constructions are omitted for clarity and conciseness.

Figure 2:
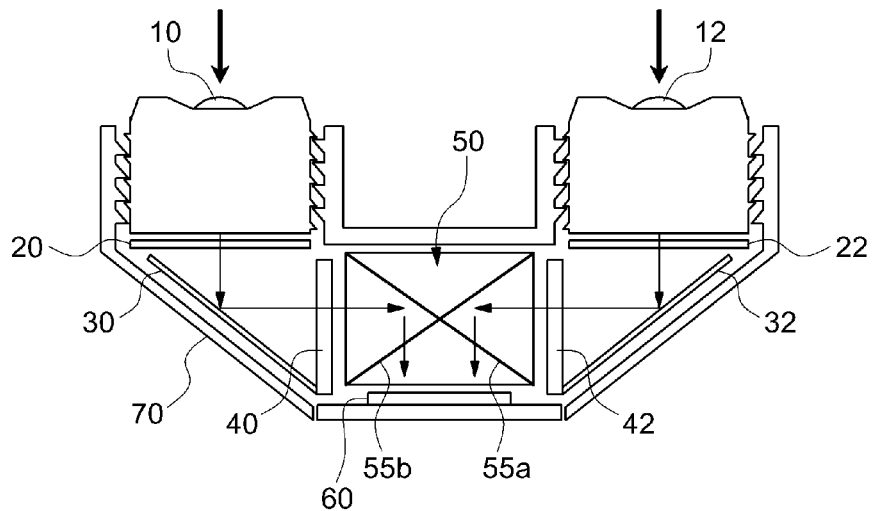
FIG. 2 is a schematic cross-sectional view illustrating a 3-dimensional camera module having an X-prism according to an exemplary embodiment of the present invention.

FIG. 1 is a schematic block diagram illustrating a 3-dimensional camera module having an X-prism according to an exemplary embodiment of the present invention, and FIG. 2 is a schematic cross-sectional view illustrating a 3-dimensional camera module having an X-prism according to an exemplary embodiment of the present invention.

Referring to FIGS. 1 and 2, the 3-dimensional camera module having an X-prism according to an exemplary embodiment of the present invention includes an X-prism (50) formed with first and second lenses (10, 12), first and second shutters (20, 22), first and second polarizers (40, 42), first and second reflection films (55a, 55b), and an image sensor (60).

In addition, the camera module may further include first and second mirrors (30, 32) for changing a light passage of an incident light, and may further include a module case (70) mounted therein with the pair of first and second shutters (20, 22), the pair of first and second polarizers (40, 42), the X-prism (50) and the image sensor (60) and forming an external appearance of camera module.

In the present exemplary embodiment, incident lights outputted from an external object are continuously received with an adequate time difference for photographing a 3D image of the external object, where the 3D image can be realized by using the X-prism (50) for selectively reflecting the incident lights and a single image sensor (60) and the shutters (20, 22) for interrupting or passing the incident lights.

The first and second lenses (10, 12) function to receive each incident light and condense the incident lights, and are respectively discretely located at a distance corresponding to two eyes to receive incident lights reflected and incident form a same object for realizing the 3D image. The lenses preferably include an asymptotic lens and an aberration compensating lens.

The first and second shutters (20, 22) are respectively positioned at a center axis of the first and second lenses (10, 12) to open and close with a time difference for interrupting or passing the condensed incident light. The reason of interrupting or passing the condensed incident light with a time difference is to obtain left/right images using the single image sensor (60) and to block dual reception of incident lights.

Thus, if the first shutter (20) is opened, the second shutter (22) is closed, and if the second shutter (22) is opened, the first shutter (20) is closed. Of course, a separate shutter driving controller (not shown) may be mounted to control the operation of the first and second shutters (20, 22). The time difference of open/close may be adequately adjusted based on several factors including motion speed of the object and brightness of the object.

The first and second mirrors (30, 32) are respectively positioned on light passages of the condensed incident light that has passed the first and second shutters (20, 22), and function to allow each incident light to face the first and second polarizers (40, 42) by changing the light passages. This is necessitated by a reason of changing the light passages of incident lights for capturing an image on the single image sensor (60), because the first and second lenses (10, 12) receive the incident lights for the same object to realize the 3D image.

The first and second polarizers (40, 42) function to vertically polarize the incident light (s polarization, perpendicular component) that has passed the first shutter (20), and to horizontally polarize the remaining incident light (p polarization, parallel component) that has passed the second shutter (22). This is to differently polarize incident lights continuously incident from each lens (10, 12) from the same object and to mutually differently reflect and pass the incident lights from reflection films (55a, 55b) of the X-prism (50), such that each incident light that has passed the each polarizer (40, 42) can face the image sensor (60) by passing any one reflection film out of the first and second reflection films (55a, 55b) and being reflected from the other reflection film.

The X-prism (50) functions to reflect and pass the incident lights based on polarization direction for allowing a first incident light and a second incident light to be sequentially incident on the image sensor (60).

Figure 3:
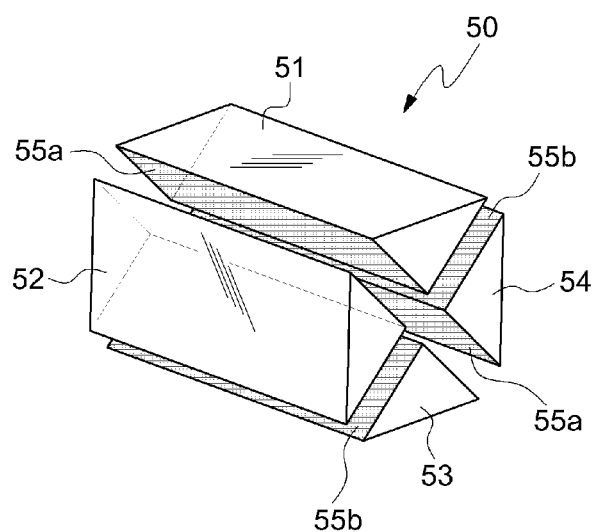
FIG. 3 is an exploded perspective view illustrating a 3-dimensional camera module having an X-prism according to an exemplary embodiment of the present invention.

FIG. 3 is an exploded perspective view illustrating a 3-dimensional camera module having an X-prism according to an exemplary embodiment of the present invention.

Referring to FIG. 3, the X-prism (50) is coupled with four prism units (51, 52, 53, 54) to take the shape of a rectangular parallelepiped. Each diagonal surface of the X-prism (50) is coated with the reflection films (55a, 55b) to selectively reflect the vertically polarized incident light and the horizontally polarized incident light. Furthermore, the reflection films (55a, 55b) are coated with dielectric substances respectively corresponding to the vertically polarized incident light and the horizontally polarized incident light to selectively determine the reflected polarizing components.

That is, the dielectric substances are so coated as to allow the incident light that has passed the first polarizer (40) that passes the vertical polarization to pass the second reflection film (55b), and to allow the incident light that has passed the first polarizer (40) that passes the vertical polarization to be reflected from the first reflection film (55a). Conversely, the dielectric substances are so coated as to allow the incident light that has passed the second polarizer (42) that passes the horizontal polarization to pass the first reflection film (55a), and to allow the incident light that has passed the second polarizer (42) that passes the horizontal polarization to be reflected from the second reflection film (55b).

The first and second reflection films (55a, 55b) may be coated on any one prism unit surface among the mutually contacting two prism units among the four prism units (51, 52, 53, 54), and thickness of the coated dielectric substances may be adjusted in consideration of reflectivity of each dielectric substances.

The image sensor (60) functions to continuously receives the vertically polarized incident light and the horizontally polarized incident light reflected from the first and second reflection films (55a, 55b) with a time difference, and generate left/right images corresponding to the vertically polarized incident light and the horizontally polarized incident light in association with the first and second shutters (20, 22). The image sensor (60) may be a CCD (Charge-Coupled Device) image sensor formed with a plurality of pixels or a CMOS (Complementary Metal-Oxide Semiconductor) image sensor.

The plurality of pixels forming the image sensor (60) is such that pixels on odd numbers are allocated to the vertically polarized incident lights, and pixels on even numbers are allocated to the horizontally polarized incident lights, and the pixels corresponding to each incident light are only activated. Therefore, two left/right images for realizing the 3D image are generated by a single one image sensor (60). Control means (not shown) capable of alternatively activating the even numbers of pixels and the odd numbers of pixels may be further mounted based on the set time difference to implement the configuration.

The module case (70) functions to protect an inner configuration mounted therein with the pair of first and second shutters (20, 22), the pair of first and second polarizers (40, 42), the X-prism (50) and the image sensor (60), and forming an external appearance of camera module, and serves to function as a dark room. The module case (70) may be configured therein with a fixing groove (not shown) to allow each inner constituent element to be stably positioned.

MODE FOR THE INVENTION

Figure 4:
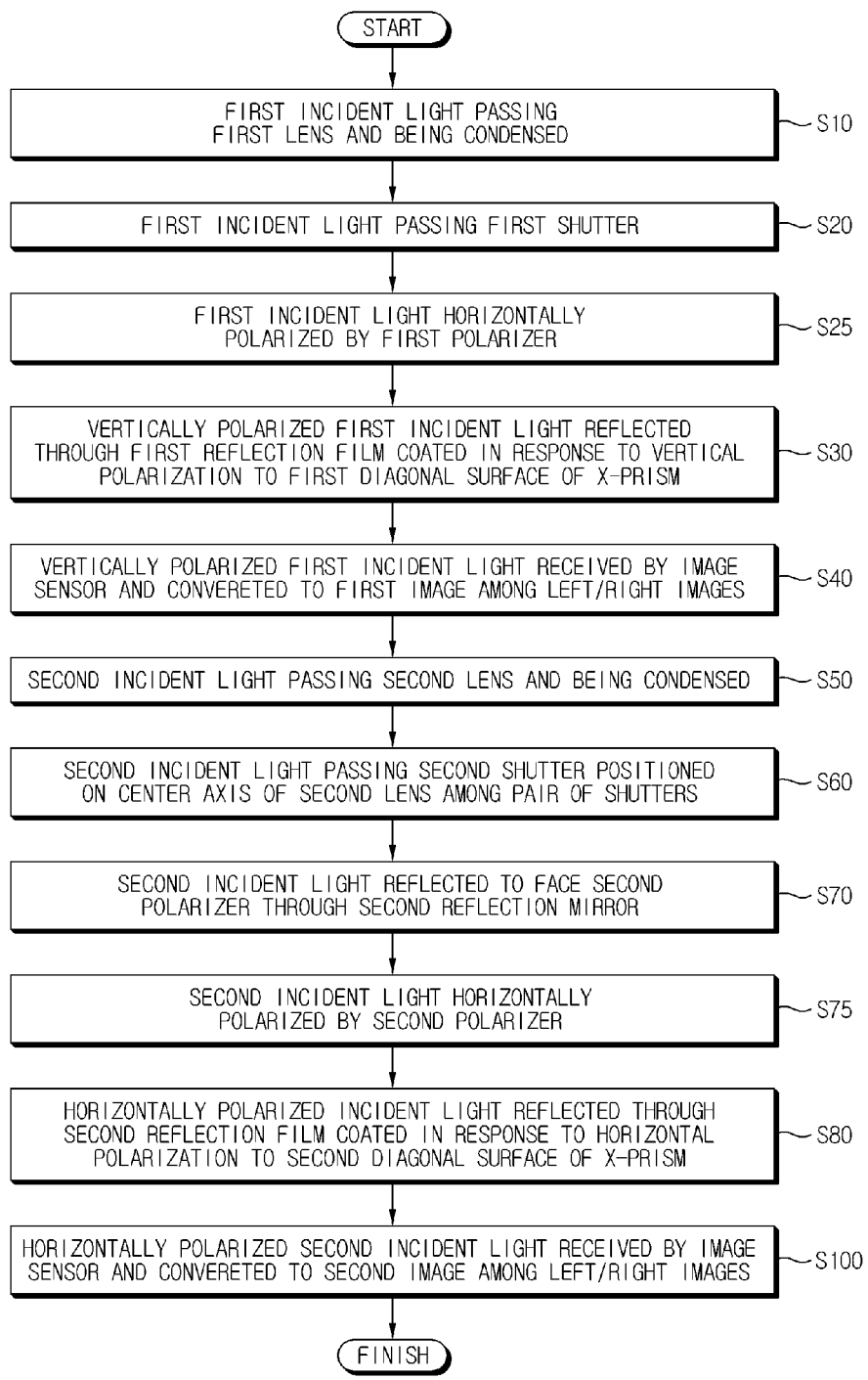
FIG. 4 is a sequential flowchart illustrating a use method of a 3-dimensional camera module having an X-prism according to an exemplary embodiment of the present invention.

FIG. 4 is a sequential flowchart illustrating a use method of a 3-dimensional camera module having an X-prism according to an exemplary embodiment of the present invention.

Referring to FIG. 4, first of all, a first incident light passes the first lens (10) among the pair of lenses (10, 12) and is condensed (S10). The condensed first incident light passes the first shutter (20) among the pair of shutters (20, 22) positioned at a center axis of the first lens (10) that is opened and closed with a time difference (S20). The first condensed incident light that has passed the first shutter (20) is reflected to face the first polarizer (40) through the first reflection mirror (30) (S25).

Next, the first condensed incident light is vertically polarized by the first polarizer (40) among the pair of polarizers (40, 42) (S30). The vertically polarized first incident light is reflected to a first diagonal surface of the X-prism shaped of a rectangular parallelepiped coupled with four prism units (51, 52, 53, 54) through a first reflection film coated in response to the vertical polarization (S40).

At this time, the first reflection film (55a) is coated with dielectric substances to allow the vertically polarized first incident light to be reflected and to allow the vertically polarized second incident light (described below) to pass.

Successively, the vertically polarized first incident light is received by an image sensor (60) activated in association with the first shutter (20) based on the time difference to be converted to any one first image among left/right images (S50), where the first image is one of two images for realizing the 3D image.

Next, a second incident light passes through the second lens (12) among the pair of lenses (10, 12) and is condensed (S60). Then, the condensed second incident light passes through the second shutter (22) positioned on a center axis of the second lens (12) among the pair of shutters (20, 22) (S70). The condensed second incident light having passed the second shutter (22) is reflected to face the second polarizer (42) through the second reflection mirror (32) (S75).

Successively, the second condensed incident light is horizontally polarized by the second polarizer (42) among the pair of polarizers (40, 42) (S80). Then, the horizontally polarized second incident light is reflected to a second diagonal surface of the X-prism (5) through the second reflection film (55b) coated in response to the horizontal polarization (S90). At this time, the second reflection film (55b) is coated with dielectric substance to allow the horizontally polarized second incident light to be reflected, and the vertically polarized first incident light to pass.

Next, the horizontally polarized second incident light to be converted to any one second image among the left/right images by being received by the image sensor (60) activated in association with the second shutter (22) based on the time difference (S100), whereby the use method using the 3D camera module using the X-prism can be implemented. At this time, the second image may realize a 3D image in a mutual combination with the first image.

To this end, the image sensor (60) including a plurality of pixels can sequentially obtain the first and second images by activating pixels in response to incident light vertically polarized in association with the first and second shutters (20, 22) and incident light that is horizontally polarized.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

INDUSTRIAL APPLICABILITY

The present invention has an industrial applicability in that the image sensor can sequentially generates left/right images with a time difference such that the 3D camera module having an X-prism can be mounted to mobile devices and other electronic devices mounted with image photographing means.

The invention claimed is:
1. A 3-dimensional camera module having an X-prism, the camera module comprising:
a pair of lenses (10, 12) condensing incident light; a pair of shutters (20, 22) positioned at a center axis of each lens to open/close with a time difference for interrupting or passing the condensed incident light;
a pair of polarizers (40, 42) vertically polarizing the incident light having passed any one shutter of the pair of shutters, and horizontally polarizing the incident light having passed the other shutter of the pair of shutters; an X-prism (50) shaped of a rectangular parallelepiped coupled with four prism units and coated with a reflection film for selectively reflecting the vertically polarized incident light and the horizontally polarized incident light to each diagonal surface of the rectangular parallelepiped; and
an image sensor (60) continuously receiving the vertically polarized incident light and the horizontally polarized incident light reflected to the reflection film with a time difference to generate left/right images corresponding to the vertically polarized incident light and the horizontally polarized incident light in association with the pair of shutter.

2. The camera module of claim 1, wherein the condensed incident light is an un-polarized light.

3. The camera module of claim 1, wherein each of the pair of shutters continuously and differently opens and closes for interrupting or passing the condensed incident light.

4. The camera module of claim 1, wherein each of the prism units takes the shape of a trigonal pillar.

5. The camera module of claim 1, wherein the reflection film is a dielectric coating respectively corresponding to the vertically polarized incident light and the horizontally polarized incident light for selectively determining reflected polarization components.

6. The camera module of claim 1, wherein the image sensor includes a plurality of pixels, the plurality of pixels being separately activated to respectively correspond to the left/right images.

7. The camera module of claim 1, further comprising a pair of reflection mirrors, each positioned on a light passage of the condensed incident light having passed the pair of shutters for changing the light passage to face the pair of polarizers.

8. The camera module of claim 1, further comprising a module case mounted therein with the pair of shutters, the pair of polarizers, the X-prism and the image sensor and forming an external appearance.

9. A method for using a 3-dimensional camera module having an X-prism, the method comprising:
allowing a first incident light to pass through a first lens among a pair of lenses and to be condensed (S10);
allowing the first condensed incident light to pass a first shutter among a pair of shutters that is opened and closed with a time difference by being positioned at a center axis of the first lens (S20);
allowing the first condensed incident light to be vertically polarized by a first polarizer among a pair of polarizers (S30);
allowing a vertically polarized first incident light to be reflected to a first diagonal surface of the X-prism shaped of a rectangular parallelepiped coupled with four prism units through a first reflection film coated in response to the vertical polarization (S40);
allowing the vertically polarized first incident light to be converted to any one first image among left/right images by being received by an image sensor activated in association with the first shutter based on the time difference (S50);
allowing a second incident light to pass through a second lens among the pair of lenses and to be condensed (S60);
allowing the condensed incident light to pass through a second shutter positioned on a center axis of the second lens among the pair of shutters (S70);

allowing the condensed second incident light to be horizontally polarized by a second polarizer among the pair of polarizers (S80);

allowing the horizontally polarized second incident light to be reflected to a second diagonal surface of the X-prism through a second reflection film coated in response to the horizontal polarization (S90); and allowing the horizontally polarized second incident light to be converted to any one second image among the left/right images by being received by the image sensor activated in association with the second shutter based on the time difference (S100).

10. The method of claim 9, wherein the first image and the second image form a 3D image by being mutually combined, in the first image conversion step (S50) of the vertically polarized first incident light and the second image conversion step (S100) of the horizontally polarized second incident light.

11. The method of claim 9, wherein the first reflection film is coated with a dielectric substance to reflect the vertically polarized first incident light, in the first reflection film reflecting step (S40) of the vertically polarized first incident light.

12. The method of claim 9, wherein the second reflection film is coated with a dielectric substance to reflect the horizontally polarized second incident light, in the second reflection film reflecting step (S90) of the horizontally polarized second incident light.

13. The method of claim 9, wherein the image sensor includes a plurality of pixels, some of the plurality of pixels being activated, in the first image converting step (S50) of the vertically polarized first incident light.

14. The method of claim 9, wherein the image sensor includes a plurality of pixels, some of the plurality of pixels being activated, in the second image converting step (S100) of the horizontally polarized second incident light.

15. The method of claim 9, further comprising a step (S25) of the first condensed incident light having passed through the first shutter being reflected to the first polarizer through a first reflection mirror, between the first shutter passing step (S20) of the condensed first incident light and the vertically polarizing step (S30) of the condensed first incident light.

16. The method of claim 9, further comprising a step (S75) of the second condensed incident light having passed through the second shutter being reflected to the second polarizer through a second reflection mirror, between the second shutter passing step (S70) of the condensed second incident light and the horizontally polarizing step (S80) of the condensed second incident light.

* * * * *